July 10, 1962          J. M. DUNN          3,043,179
FIBER OPTICAL IMAGE TRANSFER DEVICES
Filed Oct. 29, 1958          2 Sheets-Sheet 1
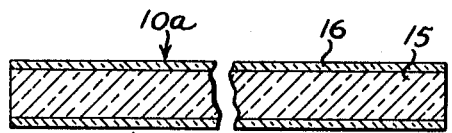
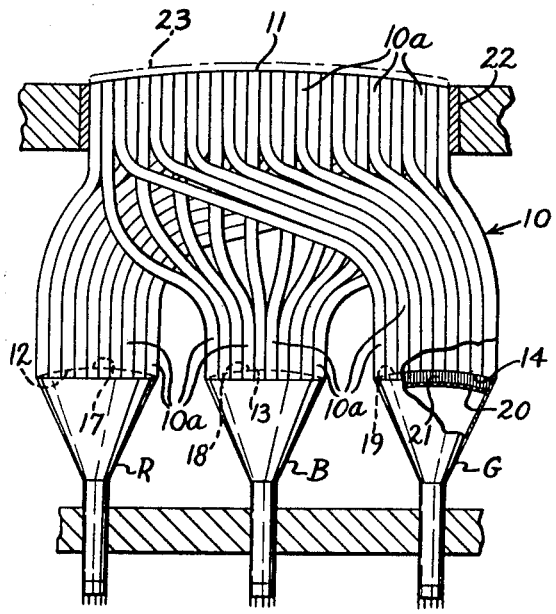
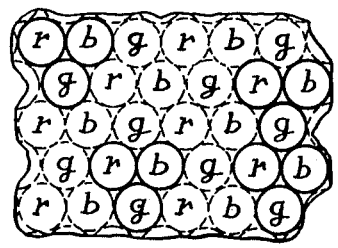
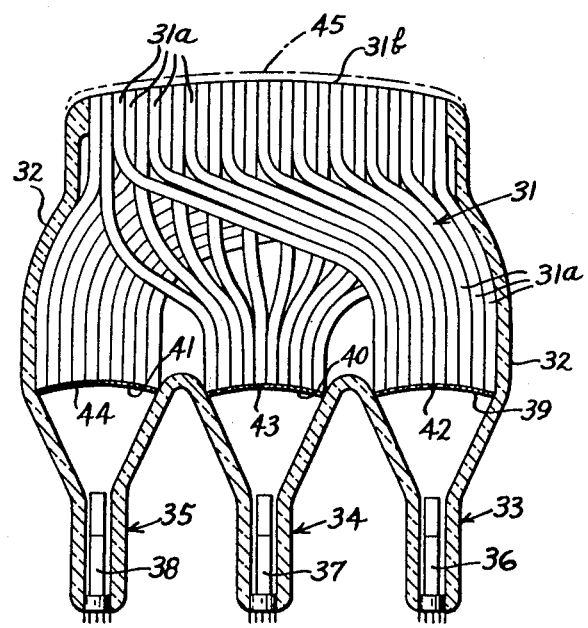
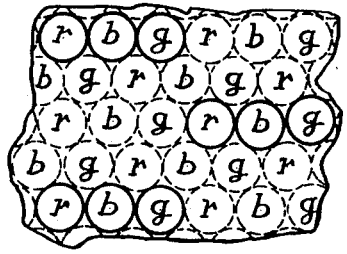
INVENTOR
JOSEPH M. DUNN
BY
Louis L. Gagnon
ATTORNEY

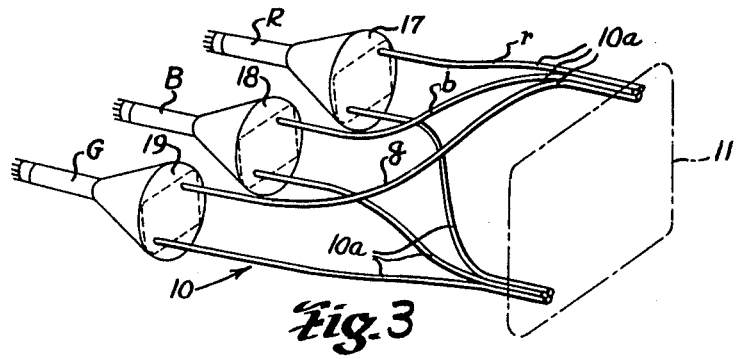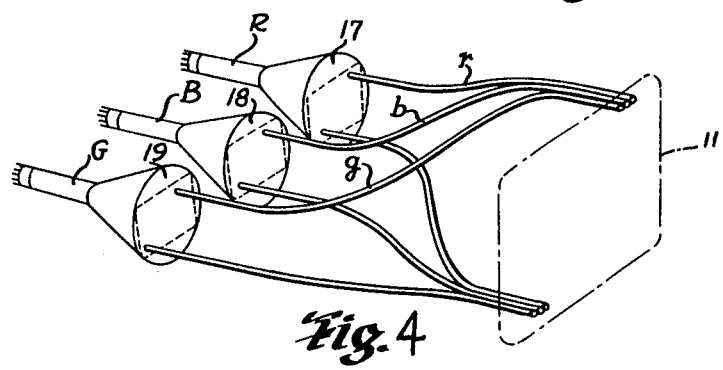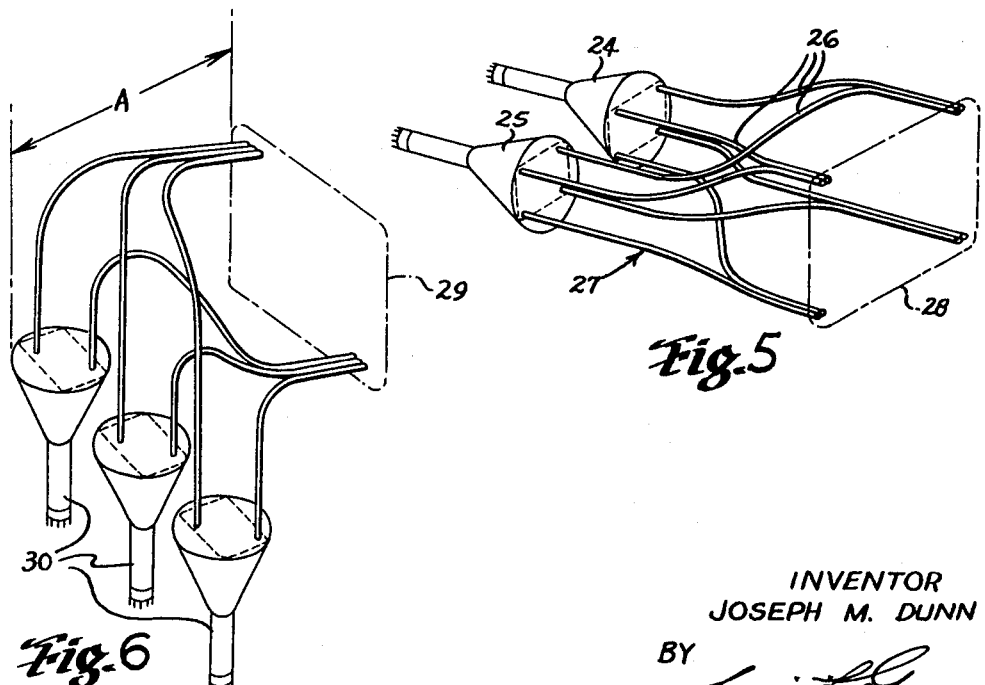

United States Patent Office 3,043,179
Patented July 10, 1962

1

3,043,179
FIBER OPTICAL IMAGE TRANSFER DEVICES
Joseph M. Dunn, Sturbridge, Mass., assignor to American Optical Company, Southbridge, Mass., a voluntary association of Massachusetts
Filed Oct. 29, 1958, Ser. No. 770,478
4 Claims. (Cl. 88—1)

This invention relates to image forming and transferring devices and has partciular reference to improved means embodying a great number of light conducting fibers or filaments so formed in grouped relation with each other as to receive at one end thereof a plurality of separate images and to combine the same at the opposite end of said fibers or filaments into a composite image of high resolution and quality.

A principal object of this invention is to provide a fiber optical device of the above character which is adapted to receive a plurality of differently characterized separate images and to transfer said images from one location to another while simultaneously combining the elements of said separate images into a composite image.

Another object is to provide a device of the above character which is more particularly adapted to produce a composite fully colored image from a plurality of individual differently colored monochromatic images.

Another object is to provide means adaptable to a television system by which a tri-colored television image may be efficiently and accurately formed from three individual differently colored groups of monochromatic image components each of which are produced by a separate picture tube.

Another object is to provide a fiber optical image forming and transferring device embodying a great number of fiber-like light-conducting elements having their ends in prearranged grouped relation with each other so as to form at one side of said device a continuous image forming face and at the other side thereof a plurality of separate image components receiving faces whereupon light entering each of said separate faces will be transferred through said fibers to said continuous image forming face of the device.

Another object is to provide a device of the above character wherein means is provided for combining the picture elements of a plurality of individual differently colored monochromatic picture image components into a single fully color balanced composite picture image.

Another object is to provide an improved fiber optical image transferring device having a great number of prearranged clusters of light conducting fibers bundled together in side-by-side relation with each other to form a substantially continuous image producing face at one of the ends of said bundled fibers and the opposite ends of the fibers of each of said clusters being directed separately apart from each other and adapted to individually receive differently characterized image forming light which, when transferred through said fibers will be received and viewed on said face, as a composite blend of said differently characterized light.

Another object is to provide a device of the above character wherein the clusters of fibers are so prearranged, in assembled side-by-side relation with each other at the image producing face of the device, as to provide said face with an all over continuous pattern of the adjacent ends of said fibers such, that each fiber of a cluster thereof carrying light of one particular character will be completely surrounded with fibers carrying differently charactericed light, whereby no two adjoining fibers at the image producing face will be used to conduct similarly characterized light.

Other objects and advantages of the invention will become apparent from the following description when taken in conjunction with the accompanying drawings in which:

FIG. 1 is a plan view of the device of the invention shown diagrammatically as being in a position of use with a television system;

FIG. 2 is a greatly enlarged fragmentary cross-sectional view of a light conducting fiber of the type used in the construction of the device of the invention;

FIG. 3 is a front perspective view of a part of the device of the invention diagrammatically illustrating one arrangement of light-conducting fibers which may be used in the construction of said device;

FIG. 4 is a view generally similar to FIG. 3 which illustrates another fiber arrangement which may be used in the construction of the device of the invention;

FIG. 5 is a view similar to FIGS. 3 and 4 illustrating still another arrangement of light conducting fibers used to form a composite image from a plurality of single image components;

FIG. 6 is a rear perspective view diagrammatically illustrating a further fiber arrangement, wherein the image receiving and the image forming faces thereof are disposed in planes angularly related with each other;

FIG. 7 is a fragmentary face view of the device of the invention, illustrating diagrammatically the particular fiber arrangement resulting from the construction illustrated by FIG. 3.

FIG. 8 is another fragmentary face view similar to FIG. 7 illustrating the particular fiber arrangement resulting from the construction illustrated by FIG. 4; and FIG. 9 is another modification of the device of the invention.

Referring more particularly to the drawings wherein like characters of reference designate like parts throughout the several views thereof, the image forming and transferring device 10 of the invention embodies a great number of light-conducting fibers 10a prearranged in grouped relation with each other so as to form at one side of the device 10, a single image forming face 11 and at the other side, thereof, a plurality of separate image receiving faces 12, 13 and 14 whereupon light entering each of the separate faces 12, 13 or 14 will be transferred through the individual fibers 10a and emitted at prearranged locations on the face 11 in accordance with the particular aligned relationship of the fibers 10a at said face 11, as will be described in detail hereinafter.

The fibers 10a are preferably of the light-insulated type such as illustrated in FIG. 2, comprising a core part 15 of high index flint glass or the like having a relatively thin outer coating or cladding 16 of low index crown glass or the like. Various techniques have been used to form fibers such as illustrated in FIG. 2 but, in all instances, a rod-like structure embodying a core part with an outer cladding is first formed and finally drawn down to a desired fiber size. It should be understood that the device of this invention is not limited to the particular type of fibers just described since other coated or uncoated fibers formed of plastic or the like, may be used if desired. It will become apparent from the description to follow, however, that coated or clad glass fibers will produce the most desirable results.

The term fiber as referred to herein, is to be interpreted as including all light-conducting elements which are relatively long and small in cross-sectional area regardless of their cross-sectional configurations.

By referring more particularly to FIGS. 1, 3, 4, 6 and 9 wherein three television picture tubes have been illustrated, as providing means by which three separately identifiable images may be produced, it will become apparent that the fiber optical device of the invention has particular useful application to tri-color television systems. Although, not being strictly limited in use to a color television system, the devices of the invention will first be described as being used in conjunction with a tri-color television receiver, embodying three individual picture tubes R, B and G (see FIGS. 1 and 3). The picture tubes R, B and G which have been illustrated diagrammatically are each adapted to receive one of the three individual video color signals of the usual composite picture signal after detection in the receiver and to reproduce said signals, as colored picture information on their respective face pieces 17, 18 and 19. For purposes of illustration the picture tube R will be assumed to have a red color producing phosphor on its face so as to produce the red picture component of the composite picture signal, tube B will have a blue phosphor to produce the blue picture component of said signal and tube G, will have a green phosphor to produce the green picture component of the composite picture signal. The scanning means, signal detectors and other associated parts of the television receiver have not been shown in the drawings since these parts are strictly conventional and form no part of this invention.

It will become apparent, however, that while picture tubes having conventional solid glass face portions, may be used in conjunction with the fiber optical device of this invention, it is preferable to provide these tubes with face pieces formed of a great number of light-conducting fibers in side-by-side relation with each other as shown in the broken away portion, of the picture tube G in FIG. 1. In this manner, light produced by the phosphor 20 within the picture tubes will be transferred or piped through the fibers 21 of the face pieces 17, 18 and 19 to the outer surfaces thereof, without the effects of haliation or parallax which are common to the conventional solid glass face pieces. Fiber optical face pieces of the above type and methods of making the same have been shown and described in detail in patent applications Serial No. 736,172 filed May 19, 1958, in the name of John W. Hicks, Jr., and Serial No. 715,406 filed February 14, 1958, now Patent No. 2,992,956, in the name of Wilfred P. Bazinet, Jr.

In one form of the device 10 of the invention the fibers 10a thereof are placed together in clusters of three adjacent their ends which are to ultimately form the face 11 of said device. In FIG. 3, there is shown one type of clustering of the fibers wherein their ends form a triangular pattern and in FIG. 4 there is shown a modified type of clustering wherein the ends of the fibers are placed in straight line side-by-side relation with each other. While the clusters of fibers in FIG. 4 have been shown as being disposed horizontally, it will become apparent that they may alternatively be disposed in a vertical direction to equal advantage.

In each of the FIGS. 3 and 4, only two clusters of fibers have been shown for purposes of more clearly illustrating the specific construction of the device of the invention. However, as shown in FIG. 1, the image forming face 11 is actually made up of a great number of these clusters of fibers which are intimately bundled in side-by-side preferably interfitting relation with each other to form an all over generally continuous surface which is optically finished to render the ends of the fibers forming said surface receptive to light. That is, by optically finishing the ends of the fibers 10a, light passing through the fibers towards said ends thereof, will be permitted to exit through the same in the well known manner common to transilluminators of this type. The image forming face 11 may be provided with a slight curvature as shown in FIG. 1 during the finishing thereof or, if desired, it may be finished flat.

The fibers 10a at the face 11 are bound together in the above mentioned assembled relation with each other either by means of a surrounding clamping ring 22 shown diagrammatically in FIG. 1 or by lightly fusing the sides of the fibers together.

Rearwardly of the image forming face 11 of the device 10, the fibers of each cluster are separated from each other and directed individually one toward the location of each of the face pieces 17, 18 and 19 of the picture tubes R, B and G so as to terminate at the plane of the front surface of the respective face pieces 17, 18 and 19 (see FIG. 3).

Thus, it can be seen that with the fibers 10a which have been designated as r, g and b arranged as shown in FIG. 5, red light from the red picture image on the picture tube R will enter the fiber r and be transferred to the face 11, green light from the picture tube G will be transferred to the face 11 by the fiber g and blue light from the picture tube B will be transferred to the face 11 by the fiber b. Due to the intimate grouping of the fibers r, g and b at the face 11, a tri-colored spot will be formed which embodies light from each of the picture tubes R, G and B.

Since the image forming face 11 of the device 10 is made up of a great number of clusters of fibers in bundled relation with each other as discussed above, and each cluster is separated rearwardly of the face 11 with the respective fibers thereof, each individually directed back to a separate one of the image planes of picture tubes R, G and B as shown more particularly in FIG. 1, it can be seen that three separate image receiving faces are provided at the image planes of the picture tubes each of which is adapted to receive the total image produced by its respective picture tube and to transfer said image to the face 11 thereby forming a composite fully colored image of the individual picture tube images.

It should be understood that in instances where the images produced by the tubes R, G and B are not differently colored but are all of the usual black and white variety, color in the composite image at the face 11 of the device may be enhanced by forming the core parts of the fibers r, g and b of differently colored glass. That is, with the fibers r formed of red glass, the fibers b, formed of blue glass and the fibers g, formed of green glass a composite of the three images produced by tubes R, G and B will be received in full color at the face 11 of the device 10. Alternatively, conventional color filters may be placed between the picture tube faces 17, 18 and 19 and the face parts 12, 13 and 14 to color the image forming light passing through the fibers 10a.

In order to provide accurate registration of the components of the picture images produced by the picture tubes R, G and B, when reproduced at the face 11, so as to assure accurate picture definition in the composite image at the face 11, it is important that each picture element or component produced by the tubes R, G and B, be transferred by the fibers 10a to a geometrical location on the face 11 which is substantially identical to its geometrical location on the tubes R, G and B. Therefore, each cluster of fibers at the face 11 is placed in a specific geometrical location relative to the other clusters, thereof, in accordance with the precise geometrical location of the image receiving ends of its individual fibers relative to the image forming face pieces of the picture tubes R, G and B. In this respect, it can be seen more clearly in FIGS. 3 and 4 that the fibers r, g and b each lead from a specific predetermined location in the upper right corner of the picture portion of each of the tubes R, B and G (the picture portions of said tubes being outlined by dotted lines), wherein said locations are geometrically identical for each tube, and when the fibers are grouped or clustered together at the face 11, the specific cluster thereof, is placed at a geometrically identical location in the upper right corner of the face 11. Likewise, fibers leading from a specific location at the lower left corners of the picture tube images would be clustered together at a specific geometrically identical location in the lower left corner of the face 11.

Referring more particularly to FIG. 1, it can be seen that with all the fibers of the device 10 in place, the image receiving faces 12, 13 and 14 each comprise in intimately bundled or tightly packed grouping of fibers 10a and these faces are optically finished to render them receptive to light. The faces 12, 13 and 14 are further shaped to the particular shape of the image field and in the case illustrated they are formed spherically concave to accurately fit the face pieces 17, 18 and 19 of the picture tubes R, B and G. The fibers 10a at the faces 12, 13 and 14 are held in place by lightly fusing their side edges together or, if desired, a clamping ring or strap may be tightened about the periphery of each bundle.

At this point, it should be apparent that the fiber optical face plates 21 of the picture tubes, offer a distinct advantage over the more conventional solid glass face plates for the reason that the image forming light produced by the phosphor 20 within the tube is transferred or piped straight through the fibers 21 to the outer faces thereof, which are in optical contact with the fibers 10a of the device 10 of the invention. With conventional solid glass face plates, the light from the phosphor 20 would be spread somewhat laterally while passing between the phosphor and faces 12, 13 and 14 thereby deteriorating, to some extent, the resolution of the images received and produced by the device of the invention.

In FIGS. 7 and 8 there has been digrammatically illustrated the fiber arrangement on the face 11 resulting from the construction illustrated by FIGS. 3 and 4 respectively.

The circular outlines represent the ends of the fibers 10a and for purposes of illustrating more clearly the clustering arrangements used in FIGS. 3 and 4, some of the fibers have been shown by dash lines while certain clusters of fibers have been shown by full lines. Further, each of the fibers of the face 11 have been lettered r, b or g in accordance with FIGS. 3 and 4 to designate the particular color of the light being directed through the same wherein r represents red light, b represents blue light and g represents green light.

It will be noted that FIG. 7 shows a face 11 formed of fibers which are clustered together in the manner illustrated in FIG. 3 whereas FIG. 8 represents a face 11 formed of fibers which are clustered together in the manner illustrated in FIG. 4. In both cases, however, it can be seen that the resultant all over color pattern is identical and a unique arrangement of fibers is provided which gives a perfectly color balanced composite image of the three monochromatic images initially produced by the picture tubes.

In carefully examining either FIG. 7 or FIG. 8, it will be noted that no two fibers which carry or transport the same colored light are in side-by-side relation with each other. That is, all fibers which transport light of one color are each entirely surrounded by fibers carrying light of different colors. For example, all of the fibers carrying red light and labeled r are completely surrounded by fibers carrying green and blue light and labeled g and b respectively. Likewise, fibers labeled b are completely surrounded by fibers labeled r and g and fibers labeled g are completely surrounded by fibers labeled r and b with the result that a perfectly color balanced composite image is produced at the face 11 due to the particular uniform all over pattern of the fiber ends at the face 11.

It is pointed out that the face 11 of the device 10 may be viewed directly to receive full benefit of the unique color balance feature of the invention or a relatively thin light diffusing screen such as shown by dot-dash lines 23 may be placed in optical contact with the face 11 to blend, by diffusion, the tri-colored light emitted by each cluster of fibers and thereby, provide a true color-balanced image which is more restful to the eyes. The screen 23 may be of the directional or nondirectional light diffusing type.

It should be understood that the degree of resolution of the image received at the face 11 of the device of the invention is entirely dependent upon the cross-sectional size of the fibers used. That is, smaller fibers (within practical limits) produce images of greater resolution and vice versa. As the fibers become smaller, they become more difficult to handle and for reasons of economy and simplicity of manufacture the fibers 10a are selected of a size only small enough to produce a picture image of good quality in accordance with the size of image and the distance from which it is to be normally viewed. A picture image when viewed close up might have a grainy appearance that would not be observed if viewed from a considerable distance away as in the case of newspaper pictures, for example:

It will be noted that the composite image on the face 11 of the device 10 has a surface area three times that of the surface area of any one of the individual images produced on the face pieces of the picture tubes R, B, or G, since the fibers 10a are of uniform cross-sectional size throughout their length. However, by constructing the device 10 of tapering fibers and arranging the larger ends thereof, in grouped relation with each other at the face 11, a composite image of the picture tube images could be formed to sizes greater than three times the size of said individual picture tube images. If it is desired to produce a composite image smaller than three times that of the individual picture tube images, so as to improve the image resolution without using extremely small fibers or to increase the light intensity thereof tapered fibers may be used and arranged with their larger ends adapted to receive the images from the picture tubes and their smaller ends grouped together to form the composite face 11.

It is pointed out that while the fibers 10a have thus far been shown and described as being substantially equal in cross-sectional size, the device of the invention may be formed of fibers which differ in cross-sectional size. Since, for example, it is a well-known fact that in conventional color television systems the green color signal carries more picture information than either the red or blue color signals, the red and blue color carrying fibers may be of a larger cross-sectional size than the green color carrying fiber without substantial loss of resolution in the composite image received at the face 11.

While the above description has dealt specifically with tri-color television systems it should be apparent that the device of the invention is readily adaptable to systems other than television systems. For example, film transparencies or the like, either of the still or motion picture type, may be placed at or passed over the image receiving faces 12, 13 and 14 of the device 10 and by projecting light through said transparencies, a composite image of the transparencies will be received at the face 11 of the device of the invention.

A modified form of the device of the invention is shown diagrammatically in FIG. 5 wherein two separate images may be interlaced or combined to be viewed as a single composite image. An arrangement such as shown in FIG. 5 would be particularly adaptable to stereo or three-dimensional television systems wherein two differently characterized stereoscopic images are produced, each on one of the face pieces of a pair picture tubes 24 and 25. The arrangement of the fibers 26 of the image forming and transfer device 27 in this instance, would be similar to that shown in FIGS. 1–4 with the exception that only two image receiving faces are formed at the plane of the picture tube faces and the opposite ends of the fibers are clustered in groups of two at the image forming face 28. Each horizontal row of fibers 26 at the face 28 would consist of alternating or interlaced fibers, every other one of which would have its opposite end disposed in the image plane of a particular one of the picture tubes 24 and 25 along a similarly geometrically located horizontal row across the image producing face of the particular picture tube.

In the case where stereoscopic images are produced by the picture tubes 24 and 25 means must be provided for rendering the images saparately identifiable to a viewer of the face 28 of the device 27. This may be accomplished in various ways, one of which would be to produce a differently colored picture tube image on each tube and to view the composite of said images on the face 28 with a pair of filters before the eyes, wherein the filter before one eye would pass the light of one color and occlude the light of the other color while the reverse condition would be true of the other filter. Thus, one eye would see only the picture components of the composite image on the face 28, which are transferred from one of the picture tubes and the other eye will see only the picture components which come from the other picture tube. The person will, in this manner, perceive the three dimensional effect of the composite image on the face 28 of the device 27. Other well known and obvious means and methods may be employed to render the above mentioned parts of the composite image separately identifiable to viewers.

In line with the above, it is also pointed out that the fiber optical arrangement or device 27 of FIG. 5 may be used to program two entirely different picture images simultaneously, wherein a composite of the two images will be received at the face 28. With suitable analyzing means before the eyes of viewers, one viewer may see only the portion of the composite image embodying one of the two different images, while another viewer will simultaneously see only the portion of the composite image embodying the other of the two different images.

In the place of the picture tubes 24 and 25, stereo film transparencies or the like either in still or motion picture form may be used to provide means for producing a composite image at the face 28 of the device 27.

The arrangement shown in FIG. 5 and described above may be used to advantage in two-color systems wherein, for example, a pair of color separation transparencies are used to replace the picture tubes 24 and 25 and are placed one against each of the image receiving faces of the device 27 with a color filter between one of the transparencies and the adjacent image receiving face of the device. A red-green two-color image may be formed by first photographing a colored object with a filter which will reject all but green light before the camera objective to provide a black and white color separation transparency bearing picture information representative of only the green portion of the object and photographing the same object with a filter which will reject all but red light before the camera objective to provide a black and white color separation transparency bearing picture information representative of only the red portion of the object. The transparencies are then placed against the image receiving faces of the device 27 with a red filter between the transparency bearing the picture information representative of the red portion of the object and its respective adjacent image receiving face of the device 27 and no filter between the other transparency and its respective adjacent face of the device 27. When light is projected simultaneously through both of the transparencies, a composite colored image will be received at the face 28 of the device 27 which resembles the natural coloring of the object originally photographed. It should be understood that a two-color composite image can also be produced by forming black and white color separation images on a pair of picture tubes such as 24 and 25 which would be positioned as shown in FIG. 5.

In view of the fact that the present day trend in television receivers is to provide relatively thin cabinets, that is, with a minimum of thickness from front to back, the devices of the invention described hereinabove may be modified as shown in FIG. 6, by simply bending the fibers between their connected opposite ends so as to position the plane of the picture tube faces at right angles to the plane of the viewing face of the device. This produces a more compact arrangement, wherein the distance or dimension A between the viewing face 29 of the modified device of FIG. 6 and the picture tubes 30 thereof, is considerably reduced over that of the devices of FIGS. 1–5.

While the image forming and transfer device of the invention has thus far been shown and described as being separable from the image producing means so as to permit quick and easy individual replacement of television picture tubes or the like, it might be desirable in some instances to provide a trinoscope arrangement wherein the image forming and transfer device of the invention is incorporated with the picture forming apparatus to provide a unitary structure such as shown in FIG. 9.

The fiber optical image forming and transfer device 31 of FIG. 9 is identical in construction and operation to the device 10 of FIG. 1 and is placed within an air tight enclosure of glass, or the like 32 which is preshaped to form necked down portions 33, 34 and 35 having conventional electron guns 36, 37 and 38 therein. The image receiving faces 39, 40 and 41 of the device 31 are each provided with phosphor coatings 42, 43 and 44 respectively in optical contact with the ends of the fibers 31a whereby an electron beam emitted by the guns 36, 37 and 38 will bombard and scan the phosphor coatings when activated. In the case of a tri-colored television system the phosphor coatings would be selected to each produce differently colored monochromatic light. Since the interior of a trinoscope such as shown in FIG. 9 must be vacuumized, it is essential that the face part 31b of the fiber optical image forming and transfer device be air tight. Therefore, any voids between the fibers must be filled or otherwise sealed. One method of forming an air tight face part 31b would be to construct the device 31 of square, octagonal or other shaped fibers which may be fitted together and when fused in side-by-side relation with each other at the face 31b an air tight seal will result. Alternatively, a relatively thin glass or plastic face plate 45 may be placed over the ends of the fibers 31a as illustrated by the dot dash lines. The face plate 45 may, if desired, be of the light diffusing type to perform the dual function of sealing off the end of the device of FIG. 9 and diffusing light which is projected therethrough.

From the foregoing it can be seen that simple and efficient means has been provided for accomplishing all of the objects and advantages of the invention. Nevertheless, it is apparent that many changes in the details of construction or arrangement of parts may be made without departing from the spirit of the invention as expressed in the accompanying claims and the invention is not limited to the exact matters shown and described as only the preferred matters have been given by way of illustration.

Having described my invention, I claim:

1. A device of the character described for use with a plurality of image-producing components, said device comprising a plurality of groups of image-transmitting elements, each of said elements embodying at least one light-conducting fiber having a light-transmitting core of a material of relatively high refractive index and having a light-insulating cladding of a material of relatively low refractive index thereon, said image-transmitting elements being arranged in substantially side-by-side relation within respective groups at one end for forming respective separate image-receiving faces which are adapted to be associated with respective image-producing components, the opposite ends of said image-transmitting elements being intermingled for defining a single composite image face in which like elements of each of said groups are arranged in a position corresponding to the respective positions of said elements in said separate image-receiving faces, whereby said composite face is adapted to display a composite image from said plurality of image-producing components.

2. A device of the character described for use with a plurality of separate individual image-producing components, said device comprising a plurality of separate groups of image-transmitting fibers, said fibers of each of said groups being secured together adjacent one end thereof in horizontal and vertical side-by-side relation in such manner as to form separate exposed first face parts, said respective like fibers of each of said first face parts being in substantially similarly geometrically bundled relation with each other, said first face parts being adapted to be associated with a respective one of each of said image-producing components and each being of a contour shape and size such as to receive an image produced by said respective image-producing components, said first face parts being so constructed as to have portions of their respective fibers extending outwardly of one side thereof and disposed in divided relation with each other, the opposite end portions of the divided like fibers of each of said respective first face parts being assembled and secured in intermingled clustered side-by-side relation with each other and with said clusters secured in horizontal and vertical side-by-side relation with each other to form a composite face part embodying said intermingled clusters, said clusters of said like fibers throughout said composite face part having a geometric pattern similar to the geometric patterns of the bundles of the individual fibers of said respective first face parts and being adapted to produce on said composite face part an image which is the composite of the image components which originate from said respective image-producing components.

3. A device of the character described for use with a plurality of separate individual image-producing components, said device comprising a plurality of separate groups of image-transmitting fibers each embodying a core of transparent material having a cladding of material of a lower index of refraction thereon, said fibers of each of said groups being secured together adjacent one end thereof in horizontal and vertical side-by-side relation in such manner as to form separate exposed first face parts, said respective like fibers of each of said first face parts being in substantially similarly geometrically bundled relation with each other, said first face parts being adapted to be associated with a respective one of each of said image-producing components and each being of a contour shape and size such as to receive an image produced by said respective image-producing components, said first face parts being so constructed as to have portions of their respective fibers extending outwardly of one side thereof and disposed in divided relation with each other, the opposite end portions of the divided like fibers of each of said respective first face parts being assembled and secured in intermingled clustered relation with each other and with said clusters secured in horizontal and vertical side-by-side relation with each other to form a composite face part embodying said intermingled clusters, said clusters of said like fibers throughout said composite face part having a geometric pattern similar to the geometric patterns of the bundles of the individual fibers of said respective first face parts and being adapted to produce on said composite face part an image which is the composite of the image components which originate from said respective image-producing components.

4. A device of the character described for use with a plurality of separate image-producing components each of a different monochromatic color, said device comprising a plurality of separate groups of image-conducting fibers each embodying a core of transparent material having a cladding of material of a lower index of refraction thereon, said fibers of each of said groups being secured together adjacent one end thereof in horizontal and vertical side-by-side relation in such manner as to form separate exposed first face parts, said respective like fibers of each of said first face parts being in substantially similarly geometrically bundled relation with each other, said first face parts being adapted to be associated with a respective one of each of said image-producing components and each being of a contour shape and size such as to receive an image produced by said respective image-producing components, said first face parts being so constructed as to have portions of their respective fibers extending outwardly of one side thereof and disposed in divided relation with each other, the opposite end portions of the divided like fibers of each of said respective face parts being assembled and secured in intermingled clustered relation with each other and with said clusters each embodying a fiber from each of said first face parts and which conduct the respective different colors from said respective differently colored image-producing components, said clusters being secured in horizontal and vertical side-by-side relation with each other to form a composite face part embodying said intermingled clusters and with all fibers conducting colored image components from one of said first face parts being completely surrounded by the fibers conducting colored image components from others of said first face parts, said clusters of said like fibers throughout said composite face part having a geometric pattern similar to the geometric patterns of the bundles of the individual fibers of said respective first face parts and being adapted to produce on said composite face part a colored image which is the composite of the image components which originate from said respective different color image-producing components.

References Cited in the file of this patent

UNITED STATES PATENTS 2,881,976      Greanias _____ Apr. 14, 1959

FOREIGN PATENTS 616,967      Great Britain _____ Jan. 31, 1949

OTHER REFERENCES

"Space Redistribution of Optical Image with Light Conducting Fiber Bundle for Color TV Pickup Tube," Davidson, RCA TN, No. 136.